United States Patent
Shveidel et al.

(10) Patent No.: US 11,409,559 B2
(45) Date of Patent: Aug. 9, 2022

(54) SYSTEM AND METHOD FOR WEAK LOCK ALLOWING FORCE PREEMPTION BY HIGH PRIORITY THREAD

(71) Applicant: EMC IP Holding Company, LLC, Hopkinton, MA (US)

(72) Inventors: Vladimir Shveidel, Pardes-Hana (IL); Ronen Gazit, Tel Aviv (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 154 days.

(21) Appl. No.: 16/662,875

(22) Filed: Oct. 24, 2019

(65) Prior Publication Data
US 2021/0124608 A1    Apr. 29, 2021

(51) Int. Cl.
*G06F 9/48* (2006.01)
*G06F 9/52* (2006.01)

(52) U.S. Cl.
CPC ........... *G06F 9/4881* (2013.01); *G06F 9/526* (2013.01)

(58) Field of Classification Search
None
See application file for complete search history.

(56) References Cited

U.S. PATENT DOCUMENTS

| | | | | |
|---|---|---|---|---|
| 5,193,188 A * | 3/1993 | Franaszek | ............... | G06F 9/466 |
| 7,206,776 B2 * | 4/2007 | Szilagyi | ................. | G06F 9/524 |
| 7,653,629 B2 * | 1/2010 | Szilagyi | ................. | G06F 9/524 |
| | | | | 707/999.008 |
| 7,788,668 B2 * | 8/2010 | Barker | ................. | G06F 9/4887 |
| | | | | 718/103 |
| 9,164,793 B2 * | 10/2015 | Antonopoulos | ........ | G06F 9/526 |
| 9,400,677 B2 * | 7/2016 | Trumbull | ............... | G06F 9/526 |
| 10,140,329 B2 * | 11/2018 | Stanfill | .................... | G06F 9/466 |
| 2007/0198979 A1 * | 8/2007 | Dice | ........................ | G06F 9/52 |
| | | | | 718/100 |
| 2008/0005737 A1 * | 1/2008 | Saha | ..................... | G06F 9/3004 |
| | | | | 718/100 |
| 2012/0297005 A1 * | 11/2012 | Langouev | ............... | G06F 9/466 |
| | | | | 709/207 |

OTHER PUBLICATIONS

Welc et al. "Preemption-Based Avoidance of Priority Inversion for Java" 2004 IEEE, 10 pages.*
McWherter et al. "Improving Preemptive Prioritization via Statistical Characterization of OLTP Locking" 2005 IEEE, 12 pages.*

* cited by examiner

*Primary Examiner* — Van H Nguyen
(74) *Attorney, Agent, or Firm* — Brian J. Colandreo; Mark H. Whittenberger; Holland & Knight LLP

(57) ABSTRACT

A method, computer program product, and computer system for identifying, by a computing device, an attribute of a lock object associated with data. It may be determined that the lock object is acquired by a first task performing a transaction with the data based upon, at least in part, the attribute of the lock object. The lock object may be acquired by a second task by releasing the lock object from the first task prior to the transaction with the data being completed, wherein the second task is a higher priority task than the first task.

9 Claims, 4 Drawing Sheets

SYSTEM AND METHOD FOR WEAK LOCK ALLOWING FORCE PREEMPTION BY HIGH PRIORITY THREAD

BACKGROUND

Consider for example purposes only a low priority background (BG) flow/thread that runs on a server system, specifically a storage cluster. Such a flow typically works during "off peak" hours and utilizes idle CPU cycles. An example of such a flow is a virtual large block (VLB) Redirection Cleaner that lazily scans all the "Leaf" pages in the system, searches for "VLB redirection" pointers (and/or other inefficiencies) and fixes them. Such a thread uses the same resources and acquires the same locks as the high priority I/O processing threads. Moreover, in many cases, it holds the lock for a long time, since a) it works lazily and b) it tends to work with big batches. So, if an I/O request requires access to the page and requests the corresponding lock, it will be delayed as a result of a long wait on the lock (e.g., until the lazy BG thread releases the lock). Hence the latency of high priority I/O request will be impacted by a low priority BG flow that is intended to utilize the idle cycles.

BRIEF SUMMARY OF DISCLOSURE

In one example implementation, a method, performed by one or more computing devices, may include but is not limited to identifying, by a computing device, an attribute of a lock object associated with data. It may be determined that the lock object is acquired by a first task performing a transaction with the data based upon, at least in part, the attribute of the lock object. The lock object may be acquired by a second task by releasing the lock object from the first task prior to the transaction with the data being completed, wherein the second task is a higher priority task than the first task.

One or more of the following example features may be included. Acquiring the lock object by the second task may include aborting the transaction being performed by the first task. Acquiring the lock object by the second task may include rolling back the transaction being performed by the first task. Acquiring the lock object by the second task may include adding one or more calls to points in a process flow of the transaction where aborting the first task would not impact data consistency. Acquiring the lock object by the second task may include adding one or more calls to points in a process flow of the transaction where rolling back the transaction would not create an unacceptable waiting time for a third task with a higher priority than the first task to acquire the lock object. Timing of when the lock object is acquired by the second task may be based upon, at least in part, a type of the lock object. The transaction may be repeated by the first task after the second task releases the lock object.

In another example implementation, a computing system may include one or more processors and one or more memories configured to perform operations that may include but are not limited to identifying, by a computing device, an attribute of a lock object associated with data. It may be determined that the lock object is acquired by a first task performing a transaction with the data based upon, at least in part, the attribute of the lock object. The lock object may be acquired by a second task by releasing the lock object from the first task prior to the transaction with the data being completed, wherein the second task is a higher priority task than the first task.

One or more of the following example features may be included. Acquiring the lock object by the second task may include aborting the transaction being performed by the first task. Acquiring the lock object by the second task may include rolling back the transaction being performed by the first task. Acquiring the lock object by the second task may include adding one or more calls to points in a process flow of the transaction where aborting the first task would not impact data consistency. Acquiring the lock object by the second task may include adding one or more calls to points in a process flow of the transaction where rolling back the transaction would not create an unacceptable waiting time for a third task with a higher priority than the first task to acquire the lock object. Timing of when the lock object is acquired by the second task may be based upon, at least in part, a type of the lock object. The transaction may be repeated by the first task after the second task releases the lock object.

In another example implementation, a computer program product may reside on a computer readable storage medium having a plurality of instructions stored thereon which, when executed across one or more processors, may cause at least a portion of the one or more processors to perform operations that may include but are not limited to identifying, by a computing device, an attribute of a lock object associated with data. It may be determined that the lock object is acquired by a first task performing a transaction with the data based upon, at least in part, the attribute of the lock object. The lock object may be acquired by a second task by releasing the lock object from the first task prior to the transaction with the data being completed, wherein the second task is a higher priority task than the first task.

One or more of the following example features may be included. Acquiring the lock object by the second task may include aborting the transaction being performed by the first task. Acquiring the lock object by the second task may include rolling back the transaction being performed by the first task. Acquiring the lock object by the second task may include adding one or more calls to points in a process flow of the transaction where aborting the first task would not impact data consistency. Acquiring the lock object by the second task may include adding one or more calls to points in a process flow of the transaction where rolling back the transaction would not create an unacceptable waiting time for a third task with a higher priority than the first task to acquire the lock object. Timing of when the lock object is acquired by the second task may be based upon, at least in part, a type of the lock object. The transaction may be repeated by the first task after the second task releases the lock object.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
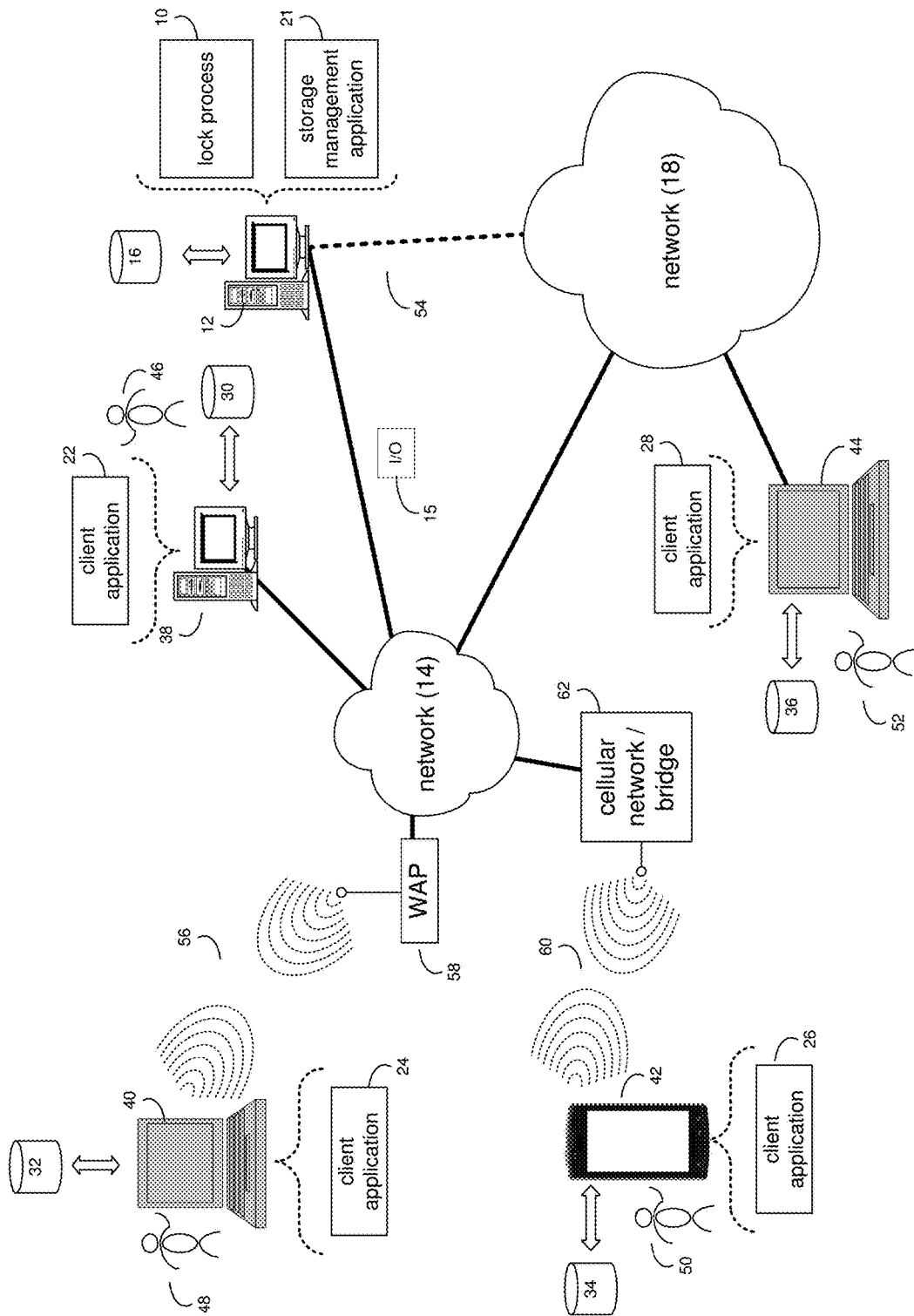
FIG. 1 is an example diagrammatic view of a lock process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to, the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown lock process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a lock process, such as lock process 10 of FIG. 1, may identify, by a computing device, an attribute of a lock object associated with data. It may be determined that the lock object is acquired by a first task performing a transaction with the data based upon, at least in part, the attribute of the lock object. The lock object may be acquired by a second task by releasing the lock object from the first task prior to the transaction with the data being completed, wherein the second task is a higher priority task than the first task.

In some implementations, the instruction sets and subroutines of lock process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, lock process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, lock process 10 and/or storage management application 21 may be accessed via one or more of client applications 22, 24, 26, 28. In some implementations, lock process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within lock process 10, a component of lock process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of lock process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of lock process 10 (and vice versa). Accordingly, in some implementations, lock process 10 may be a purely server-side application, a purely client-side application, or a hybrid server-side/client-side application that is cooperatively executed by one or more of client applications 22, 24, 26, 28 and/or lock process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, lock process 10, and storage management application 21, taken singly or in any combination, may effectuate some or all of the same functionality, any description of effectuating such functionality via one or more of client applications 22, 24, 26, 28, lock process 10, storage management application 21, or combination thereof, and any described interaction(s) between one or more of client applications 22, 24, 26, 28, lock process 10, storage management application 21, or combination thereof to effectuate such functionality, should be taken as an example only and not to limit the scope of the disclosure.

In some implementations, one or more of users 46, 48, 50, 52 may access computer 12 and lock process 10 (e.g., using one or more of client electronic devices 38, 40, 42, 44) directly through network 14 or through secondary network 18. Further, computer 12 may be connected to network 14 through secondary network 18, as illustrated with phantom link line 54. Lock process 10 may include one or more user interfaces, such as browsers and textual or graphical user interfaces, through which users 46, 48, 50, 52 may access lock process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
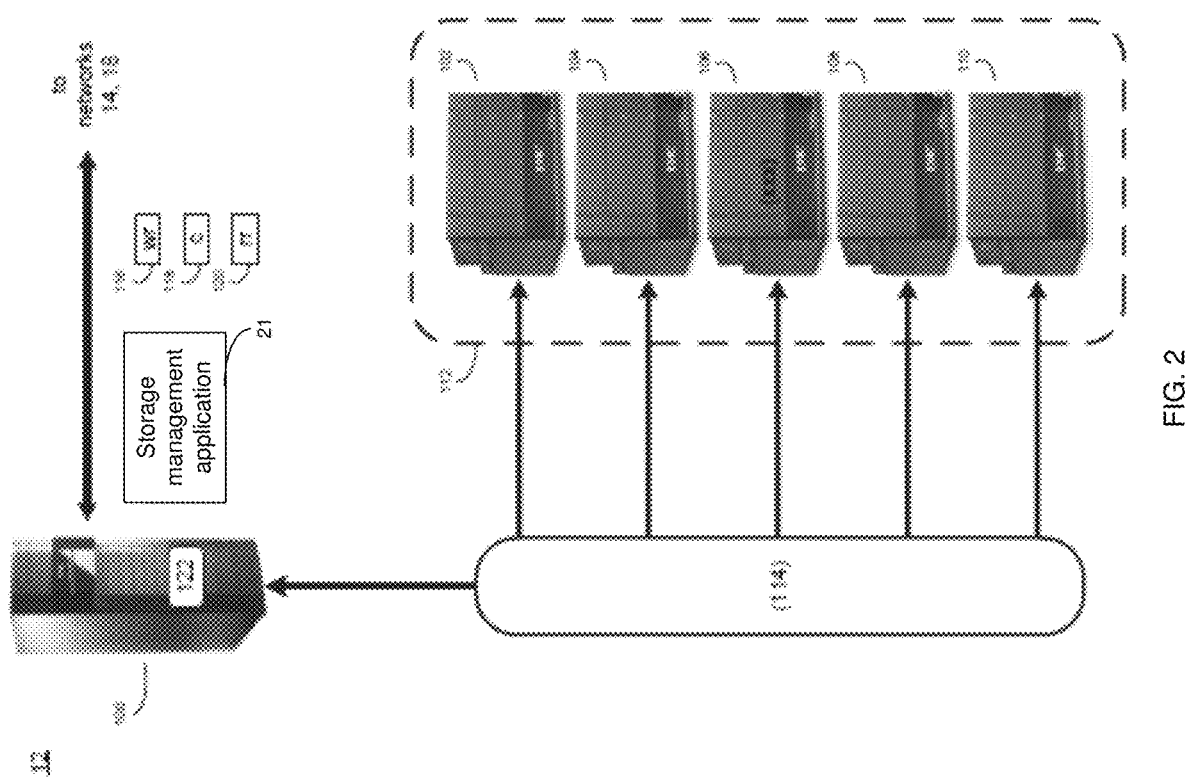
FIG. 2 is an example diagrammatic view of a storage system of FIG. 1 according to one or more example implementations of the disclosure.
Figure 3:
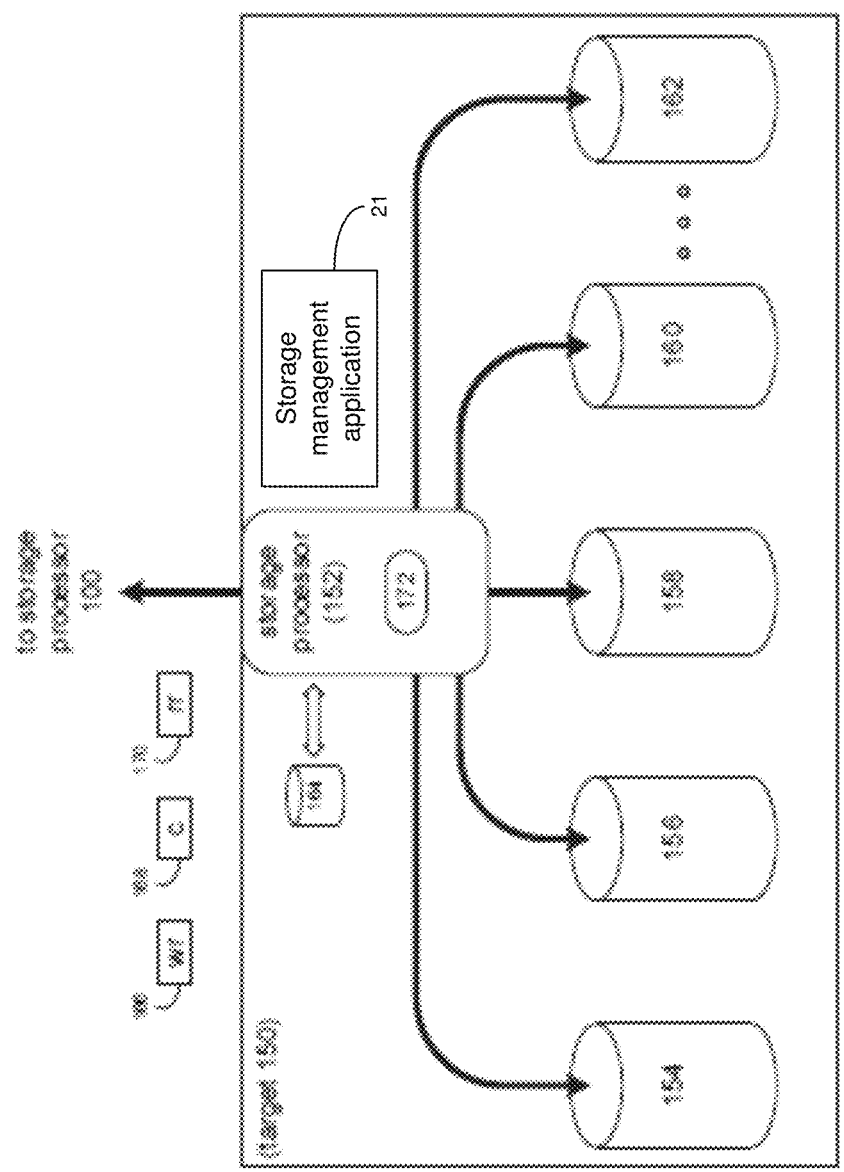
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets

102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or lock process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, MA. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Consider for example purposes only a low priority background (BG) flow/thread that runs on a server system, specifically a storage cluster. Such a flow typically works during "off peak" hours and utilizes idle CPU cycles. An example of such a flow is a virtual large block (VLB) Redirection Cleaner that lazily scans all the "Leaf" pages in the system, searches for "VLB redirection" pointers (and/or other inefficiencies) and fixes them. Such a thread uses the same resources and acquires the same locks as the high priority I/O processing threads. Moreover, in many cases, it holds the lock for a long time, since a) it works lazily and b) it tends to work with big batches. So, if an I/O request requires access to the page and requests the corresponding lock, it will be delayed as a result of a long wait on the lock (e.g., until the lazy BG thread releases the lock). Hence the latency of high priority I/O request will be impacted by a low priority BG flow that is intended to utilize the idle cycles.

Thus, as will be discussed below, to avoid the impact of lazy BG processes on the latency of (high priority) I/O requests, the present disclosure may enable a weak lock allowing force preemption by a high priority thread. This may be particularly beneficial when the system is underutilized, and the host is expected to have excellent latency numbers, and this is also the period where background operations kick into action. As such, if the lock was acquired in a "weak mode" (e.g., by a low priority task), it may be force preempted by a higher priority thread/task. In this example, the lower priority task may receive an abort notification/indication and may abort/rollback the outstanding transaction (and repeat it later, when the lock is released).

Figure 4:
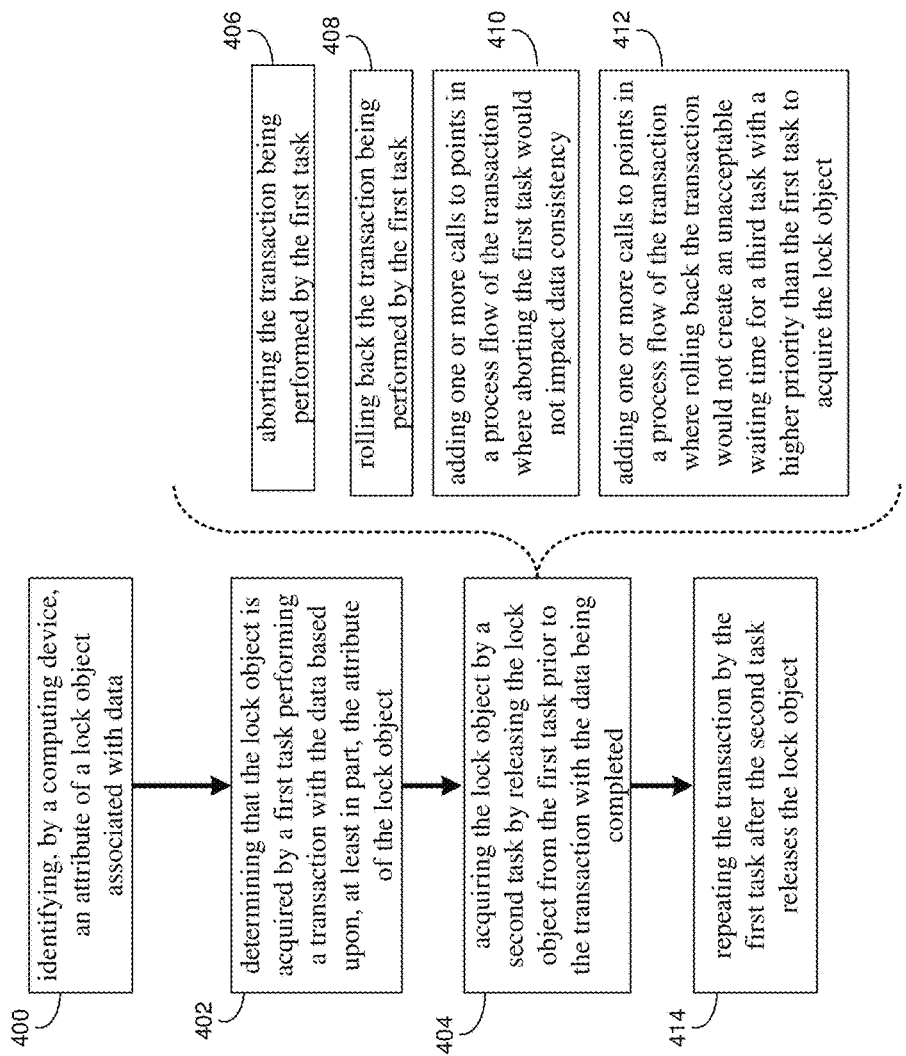
FIG. 4 is an example flowchart of a lock process according to one or more example implementations of the disclosure.

The Lock Process:

As discussed above and referring also at least to the example implementations of FIG. 4, lock process 10 may identify 400, by a computing device, an attribute of a lock object associated with data. Lock process 10 may determine 402 that the lock object is acquired by a first task performing a transaction with the data based upon, at least in part, the attribute of the lock object. Lock process 10 may acquire 404 the lock object by a second task by releasing the lock object from the first task prior to the transaction with the data being completed, wherein the second task is a higher priority task than the first task.

In some implementations, lock process 10 may identify 400, by a computing device, an attribute of a lock object associated with data, and in some implementations, lock process 10 may determine 402 that the lock object is acquired by a first task performing a transaction with the data based upon, at least in part, the attribute of the lock object. For example, in some implementations, the disclosed "weak lock" may be an extension of a regular Lock synchronization object, and may be applicable to different types of synchronization objects, e.g., RW-Lock, Barrier, Semaphore, etc. Assume for example purposes only that a first task/thread needs to perform a transaction on data, and therefore needs to acquire a lock object corresponding to the data (e.g., to prevent other processes from changing the data while the first task is performing its transaction, thereby causing inconsistencies in the data). In the example, an attribute of the lock object required by the first task to access to data (e.g., a particular page of data) and perform the transaction on the data (e.g., read/write, etc.) may be identified 400. In some implementations, the attribute may be a "weak mode" Boolean attribute that is added to the lock object. The attribute may determine whether the mode lock was acquired by a low priority task or a high priority task (e.g., TRUE indicates that the lock is acquired in weak mode (e.g., by a low priority task) and FALSE indicates that the lock is not acquired in weak mode (e.g., by a high priority task)) and so lock process 10 may not be able to force preempt the lock object, as will be discussed below.

In some implementations, lock process 10 may acquire 404 the lock object by a second task by releasing the lock object from the first task prior to the transaction with the data being completed, wherein the second task is a higher priority task than the first task. For example, since the second task is considered a "high" priority task (or at least a higher priority task than the first task), the higher priority task may be able to preemptively acquire 404 the lock object (by making the first task release the lock object) to perform its own transaction on the data, even though another lower priority task (the first task) already has acquired the lock object and is performing its transaction on the data.

In some implementations, acquiring the lock object by the second task may include rolling back 406 the transaction being performed by the first task, and in some implementations, acquiring the lock object by the second task may include aborting 408 the transaction being performed by the first task. For example, the lower priority task (e.g., the first task) may receive an abort notification/indication and may abort and/or rollback the outstanding transaction. For example, a new Yield Lock( ) call (via lock process 10) may be defined. In some implementations, the Yield Lock( ) checks the waiting queue of the lock object. If the waiting queue is empty, the call may return SUCCESS. If the waiting queue is not empty, the lock object may be released and the call function may return ABORTED. In some implementations, this technique/API may be used by the thread (task) acquiring the lock object in weak mode (i.e., the lower priority thread). As will be discussed below, another new TryYieldLock( ) call may be defined. An example difference with Yield Lock( ) is that TryYieldLock( ) does not actually release the lock object. In some implementations, if a cooperative thread model is applied, the thread (task) holding the lock object may not be aborted immediately.

In some implementations, acquiring the lock object by the second task may include adding 410 one or more calls to points in a process flow of the transaction where aborting the first task would not impact data consistency. For example, the above-noted YieldLock( ) calls may be added 410 throughout the (low priority) flow holding the weak lock in points where the flow may be aborted without impact on the data consistency (e.g., out of transactional/atomic changes in non-local context.). If the Yield Lock( ) call returns SUCCESS, the flow may continue, and if the call returns ABORTED, the flow may be aborted (and the repeat may be triggered as discussed further below).

In some implementations, acquiring the lock object by the second task may include adding 412 one or more calls to points in a process flow of the transaction where rolling back the transaction would not create an unacceptable waiting time for a third task with a higher priority than the first task to acquire the lock object. For example, in some implementations, the TryYieldLock ( ) calls may be added 412 throughout the low priority flow in the points where abort and rollback are possible. The calls may be added so that the processing time between two subsequent TryYieldLock( ) calls does not exceed an acceptable (for a high priority thread) waiting time. In the example, if the TryYieldLock( ) call returns SUCCESS, the flow may continue, and if the call returns ABORTED, lock process 10 (e.g., via the first task) may roll back the last (aborted) update to return to data consistency, may release the lock object, the flow may be aborted, and the flow repeat may be triggered.

In some implementations, timing of when the lock object is acquired by the second task may be based upon, at least in part, a type of the lock object. For example, there may be one or more rules of lock object preemptions. For example, an exclusive (write lock) cannot be preempted immediately (on a high priority thread request). For instance, it may be preempted on the next Yield Lock( ) call. As another example, a shared (read) lock may be preempted in at least two different modes (depending on its application). For instance, in an "optimized mode", the lock object may be released immediately on a high priority thread request. So the YieldLock ( ) does nothing but return ABORTED (the lock is already preempted in this case). As another example, in a "safe mode", preemption rules may be similar or the same as noted above for the exclusive lock (e.g., by the next YieldLock( ) call).

In some implementations, if a preemptive thread model is applied, then the weak lock may be force preempted immediately by a high priority thread request (i.e., the Lock( ) request). In this example, the low priority thread may be immediately aborted (and may perform all the required clean-ups in the abort flow). In some implementations, it may be the responsibility of the high priority thread to verify the consistency of data in cases where the lock object was preempted.

In some implementations, lock process 10 may repeat 414 the transaction by the first task after the second task releases the lock object. For example, once the high priority thread has completed its task (and released the lock object), the lower priority task may then acquire the lock object and repeat 414 its originally intended transaction on the data (i.e., the transaction it would have performed if the higher priority task had not force preempted the lock object).

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   identifying, by a computing device, an attribute of a lock object associated with data;
   determining that the lock object is acquired by a first task performing a transaction with the data based upon, at least in part, the attribute of the lock object; and
   acquiring the lock object by a second task by releasing the lock object from the first task prior to the transaction with the data being completed, wherein the second task is a higher priority task than the first task, wherein acquiring the lock object by the second task includes aborting the transaction being performed by the first task, wherein the high priority task is configured to verify consistency of data when the transaction being performed by the first task is aborted, wherein timing of when the lock object is acquired by the second task is based upon, at least in part, whether the lock object is an exclusive lock or a shared lock, wherein acquiring the lock object by the second task includes:
   rolling back the transaction being performed by the first task; and
   adding one or more calls to points in a process flow of the transaction where rolling back the transaction would not create an unacceptable waiting time for a third task with a higher priority than the first task to acquire the lock object.

2. The computer-implemented method of claim 1 wherein acquiring the lock object by the second task includes adding one or more calls to points in a process flow of the transaction where aborting the first task would not impact data consistency.

3. The computer-implemented method of claim 1 further comprising repeating the transaction by the first task after the second task releases the lock object.

4. The computer-implemented method of claim 1 wherein an attribute of the lock object associated with data includes a lock synchronization object that is configured to be used with a synchronization object, wherein the synchronization object includes one or more of an RW-Lock, a Barrier, and a Semaphore.

5. A computer program product residing on a non-transitory computer readable storage medium having a plurality of instructions stored thereon which, when executed across one or more processors, causes at least a portion of the one or more processors to perform operations comprising:
   identifying an attribute of a lock object associated with data;
   determining that the lock object is acquired by a first task performing a transaction with the data based upon, at least in part, the attribute of the lock object; and
   acquiring the lock object by a second task by releasing the lock object from the first task prior to the transaction with the data being completed, wherein the second task is a higher priority task than the first task, wherein acquiring the lock object by the second task includes aborting the transaction being performed by the first task, wherein the high priority task is configured to verify consistency of data when the transaction being performed by the first task is aborted, wherein timing of when the lock object is acquired by the second task is based upon, at least in part, whether the lock object is an exclusive lock or a shared lock, wherein acquiring the lock object by the second task includes:
   rolling back the transaction being performed by the first task; and
   adding one or more calls to points in a process flow of the transaction where rolling back the transaction would not create an unacceptable waiting time for a third task with a higher priority than the first task to acquire the lock object.

6. The computer program product of claim 5 wherein acquiring the lock object by the second task includes adding one or more calls to points in a process flow of the transaction where aborting the first task would not impact data consistency.

7. The computer program product of claim 5 wherein the operations further comprise repeating the transaction by the first task after the second task releases the lock object.

8. A computing system including one or more processors and one or more memories configured to perform operations comprising:
   identifying an attribute of a lock object associated with data;
   determining that the lock object is acquired by a first task performing a transaction with the data based upon, at least in part, the attribute of the lock object; and
   acquiring the lock object by a second task by releasing the lock object from the first task prior to the transaction with the data being completed, wherein the second task is a higher priority task than the first task, wherein acquiring the lock object by the second task includes aborting the transaction being performed by the first task, wherein the high priority task is configured to verify consistency of data when the transaction being performed by the first task is aborted, wherein timing of when the lock object is acquired by the second task is based upon, at least in part, whether the lock object is an exclusive lock or a shared lock, wherein acquiring the lock object by the second task includes:
   rolling back the transaction being performed by the first task; and
   adding one or more calls to points in a process flow of the transaction where rolling back the transaction would not create an unacceptable waiting time for a third task with a higher priority than the first task to acquire the lock object.

9. The computing system of claim 8 wherein acquiring the lock object by the second task includes adding one or more calls to points in a process flow of the transaction where aborting the first task would not impact data consistency.

* * * * *